(12) United States Patent
Zhang et al.

(10) Patent No.: US 8,367,209 B2
(45) Date of Patent: Feb. 5, 2013

(54) NANOENGINEERED COMPOSITE DEFOG COATING

(75) Inventors: Ruiyun Zhang, York, PA (US); Arthur J. Yang, Lancaster, PA (US)

(73) Assignee: Industrial Science & Technology Network, Inc., York, PA (US)

( * ) Notice: Subject to any disclaimer, the term of this patent is extended or adjusted under 35 U.S.C. 154(b) by 708 days.

(21) Appl. No.: 12/311,355

(22) PCT Filed: Feb. 8, 2007

(86) PCT No.: PCT/US2007/003534
§ 371 (c)(1),
(2), (4) Date: Mar. 27, 2009

(87) PCT Pub. No.: WO2008/039228
PCT Pub. Date: Apr. 3, 2008

(65) Prior Publication Data
US 2010/0028694 A1    Feb. 4, 2010

Related U.S. Application Data

(60) Provisional application No. 60/847,662, filed on Sep. 28, 2006.

(51) Int. Cl.
*B32B 27/00* (2006.01)
*B32B 17/10* (2006.01)
*B32B 27/30* (2006.01)
*C07C 69/66* (2006.01)
*C08K 3/36* (2006.01)

(52) U.S. Cl. ............... 428/411.1; 977/778; 977/773; 428/412; 428/483; 428/510; 428/520; 428/522; 524/847; 560/179

(58) Field of Classification Search ............... 428/411.1, 428/522, 441, 442, 412, 483, 510, 520; 524/847; 977/778
See application file for complete search history.

(56) References Cited

U.S. PATENT DOCUMENTS

| 4,977,013 | A  | * | 12/1990 | Ritchie et al. ............... 428/212 |
| 6,083,393 | A  | * | 7/2000  | Wu et al. ................. 210/500.35 |
| 6,329,060 | B1 | * | 12/2001 | Barkac et al. .............. 428/423.1 |
| 2004/0234487 | A1 | * | 11/2004 | Bremser et al. ............ 424/70.17 |
| 2005/0209382 | A1 |   | 9/2005  | Yale et al. |

FOREIGN PATENT DOCUMENTS

EP   444864 A2 * 9/1991

OTHER PUBLICATIONS

International Search Report dated Oct. 29, 2007 for PCT/US2007/003534.

* cited by examiner

*Primary Examiner* — Harold Pyon
*Assistant Examiner* — Katie L Hammer
(74) *Attorney, Agent, or Firm* — Jones Day

(57) ABSTRACT

An engineered nano-composite coating may include hydrophobic an hydrophilic domains, may be applied to transparent and non-transparent substrates using a continuous process, may be UV curable and may impart antifogging characteristics to the substrate.

29 Claims, 2 Drawing Sheets

Figure 1:
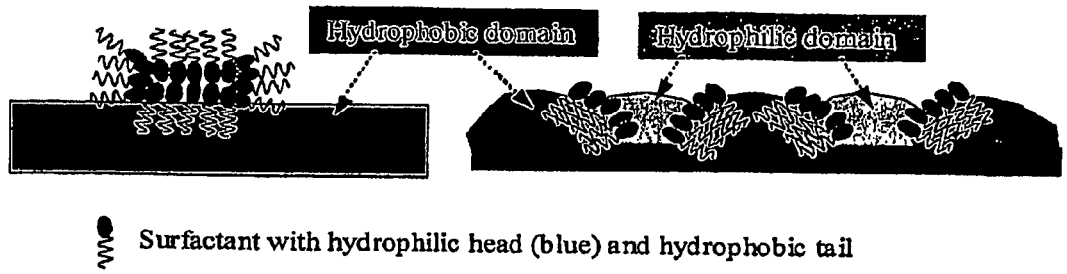

Surfactant with hydrophilic head (blue) and hydrophobic tail

○ Surfactant with hydrophilic head (blue) and hydrophobic tail

HEA:

NANOENGINEERED COMPOSITE DEFOG COATING

CROSS REFERENCE TO RELATED APPLICATIONS

This application is the National Phase application of International Application No. PCT/US2007/003534, filed Feb. 8, 2007, which designates the United States and was published in English, and which claims the benefit of priority from U.S. Provisional Application No. 60/847,662, filed Sep. 28, 2006. These applications, in their entirety, are incorporated herein by reference.

BACKGROUND OF THE INVENTION

Advancements in nanotechnology have led to many exciting designs of new products with superior performance. Among applications in various fields, nanotechnology application in the optical display market is considered to be of particular commercial value. The most important asset of a nanotechnology is its ability to accomplish enhanced performance by controlling a material's composition and morphology at nanometer scales. When the size of phase domains in a composite is made much smaller than the wavelength of light (450~600 nm), the composite's transparency and clarity can be dramatically improved. Light scattering from domains of different refractive indexes is in proportion to the fourth power of the size to wavelength ratio [i.e. $\sim(a/\lambda)^4$] and, therefore, could be significantly reduced by decreasing domain size. When the domain size is reduced below about 50 nm, the haze level resulting from scattering becomes negligible. Thus, composite nanotechnology provides opportunity for a new generation of optical products, for example, making highly transparent functional coatings for displaying devices. A composite could be designed to accomplish a special function (antiglare, antireflection, anti-staining, antistatic, etc.) and yet with extremely low haze due to the application of nanotechnology. For example, reference is made to the co-pending applications in the names of one or both (or more) of the present inventors: application Ser. No. 10/514,018, filed Nov. 10, 2004; Provisional Application Ser. No. 60/656,096, filed Feb. 25, 2005; Provisional Application Ser. No. 60/659,097, filed Feb. 25, 2005; PCT Application US06/006239, filed Feb. 23, 2006; PCT Application US06/006240, filed Feb. 23, 2006, the disclosures of which are incorporated, herein, in their entireties, by reference thereto.

Fogging is due to water droplets formed by moisture condensation on a solid surface when its temperature is below the dew point. When a cold surface comes in contact with warm, moist air, tiny water droplets condense on the cold surface. The refractive index differences among water droplets (n~1.33), air (n~1) and the substrate (n~1.45) lead to diffusive light scattering and often causes the surface to become translucent. Because of the much-increased use of air conditioning in high humidity areas, fogging of windows, optical glasses and displaying devices has become a major nuisance to users.

Prior art antifog (AF) technologies typically included two approaches to maintain a surface transparent after moisture condensation. To prevent fogging, one could treat a surface by applying a completely hydrophilic coating to absorb all the water molecules into the coating's interior; or alternatively, one could embed hydrophilic surfactants within an otherwise hydrophobic coating to reduce the water contact angle and to spread condensed moisture from scattered and scattering droplets into a flat film (sheeting), thereby minimizing the transmission loss. Both approaches have their own limitations and shortcomings.

Current water absorbing AF coating systems are normally made from crosslinked or non-crosslinked hydrophilic polymers (Hydrophilic acrylic polymers or copolymers: U.S. Pat. No. 3,865,619, U.S. Pat. No. 5,244,935, U.S. Pat. No. 6,506,446, EP 0399441; Crosslinked Polyvinyl Alcohol: U.S. Pat. No. 4,478,909, U.S. Pat. No. 5,262,475, U.S. Pat. No. 5,075,133, U.S. Pat. No. 6,800,365; Hydrophilic Polyurethane: U.S. Pat. No. 3,821,136, U.S. Pat. No. 5,877,254, US Patent Application Publication 20040137155). Water molecules can easily diffuse into this hydrophilic coating layer, thus, preventing moisture condensation on the substrate surface. It is fairly easy to make, but the absorption capacity is limited by the thickness of the coating. In addition, the slow kinetics of absorption by diffusion may not be sufficient to prevent instant fogging in a high humidity environment. If the absorption capacity is saturated either kinetically or thermodynamically, the coating loses its AF effect. The water entrapped in the coating will also swell the coating layer and make the coating more susceptible to mechanical and chemical damages. Adhesion failure, or even delamination, often occurs when used in a high humidity environment.

These mechanical failures are caused by water adsorption into a coating and the subsequent swelling of the coating resin. The second approach was designed to reduce water adsorption by spreading condensed water droplets into a surface thin film. Inclusion of hydrophilic surfactants in a hydrophobic coating could reduce the contact angle, and spread a water droplet into a flat film, if the surfactants migrate to the top surface during processing (U.S. Pat. No. 3,929,699, U.S. Pat. No. 4,214,908, U.S. Pat. No. 4,609,688, U.S. Pat. No. 5,451,460).

Most current approaches include incorporating mobile surfactants into a coating matrix. When moisture condensation occurs, these surfactants will either migrate or turn around to the top surface to reduce the water-solid interfacial tension and the contact angle. However, due to the required mobility, the surfactants are not chemically bonded to the coating structure. Consequently, the surfactants will be washed off the surface either by repeated uses or cleanings, leading to fade-away AF effects. As such, they are suitable for providing only a temporary, i.e. not durable, AF effect. In addition, this surface is prone to damage and staining. Moreover, the plasticizing effect of the surfactant on the coating surface often makes the coating more vulnerable to abrasions and contaminations.

BRIEF DESCRIPTION OF DRAWING FIGURES

FIG. 1 is a schematic, exaggerated view illustrating a representative arrangement of nanocomposite (diagram at right), according to an embodiment of the present invention, with anchored surfactant, substantially in the hydrophopic domains, separated by hydrophilic domains; the diagram at left represents an example of prior arts using mobile surfactants with a coating containing only the hydrophobic domain. FIG. 1 further illustrates a nanoengineered hydrophobic and hydrophilic composite with anchored surfactants (at right). The diagram at left is a conventional hydrophobic coating with the surfactants assembling at the top surface as micelles which could be washed away by repeated uses. The hydrophilic domains in nanocomposite coating accomplished by this invention (at right) help spread the surfactants at the top surface, which can then be anchored with the hydrophobic domains permanently via a proper curing process.

Figure 2:
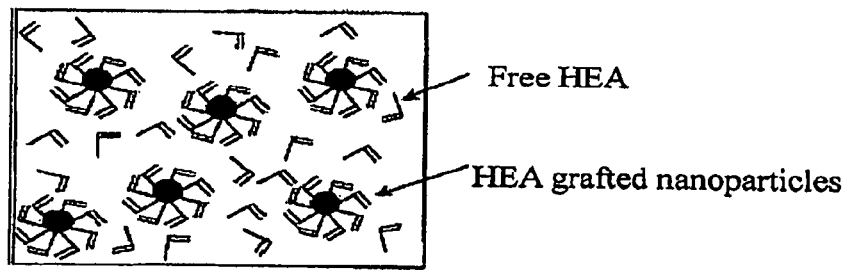
Figure 2:
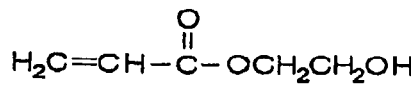
Figure 3:
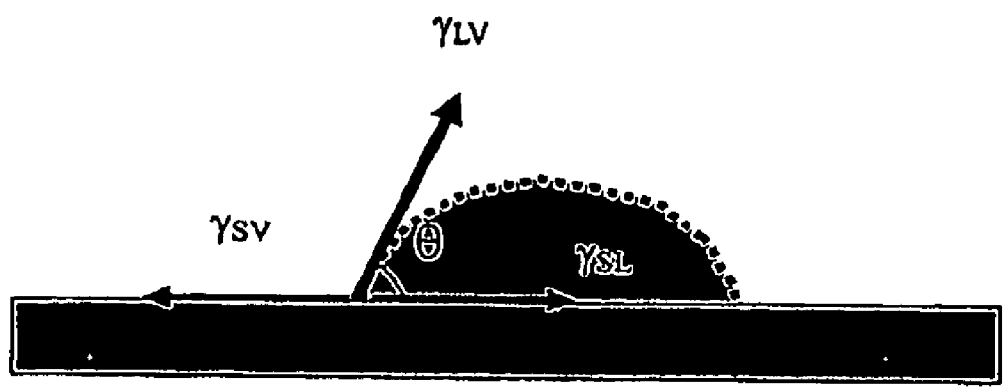

FIG. 2 illustrates chemical structure of hydroxyethylacrylate (HEA) and includes a schematic graphical representation of HEA grafted nanoparticles according to an embodiment of the present invention; and FIG. 3 is a graphical representation of contact angle.

SUMMARY OF INVENTION

The present invention, provides a nano-engineered composite technology that can prevent fogging on any transparent or non-transparent object.

According to embodiments of the present invention, as will be described in more detail below, the present antifog coating systems modify the substrate surface to be highly hydrophilic with the water-substrate contact angle being close to zero, thereby providing long lasting durable water sheeting under adverse conditions. The hydrophilic substrate surface, for example, allows the condensed water to wet the coating surface without forming droplets, resulting in a completely transparent water film on the substrate surface, even under highly humid conditions and/or after long term use and/or water washing.

The technology incorporated into the preferred embodiments of the present invention create a hydrophobic-hydrophilic nanocomposite where the hydrophobic component may include ingredients of a hard coating and the hydrophilic component can be either organic, inorganic or a combination thereof. The composite will have sufficient water absorbing capability and yet not be excessively swollen by entrapped water, thereby providing good mechanical strength in both dry and wet states. The preferred coating has adequate surfactant concentration with hydrophilic segments exposed to air in order to reduce the overall contact angle to, or nearly to, 0°, e.g. about 10° or lower.

The creation of a nanocomposite coating with both hydrophobic and hydrophilic domains at nanometer scale is the first essential step of the present invention. The presence of the hydrophilic domains at top surface could accomplish two major functions: (a) adsorbing moisture to prevent instant fogging under use conditions, and (b) helping orient the surfactants assembly at a coating surface (as illustrated by FIG. 1) so that the hydrophobic tail of the surfactants can mostly be immersed with the hydrophobic domains. (Comparison shown at FIG. 1 demonstrated the self-assembling of surfactants into micelles at a surface with only a hydrophobic domain). The second essential step of this invention is to permanently anchor the submerged surfactants with the hydrophobic domains to create long lasting antifogging effect. The anchoring of the surfactants was accomplished by using a surfactant having a reactive segment in its hydrophobic tail that can later be reacted (cured) with the reactive components contained in the hydrophobic domains. The curing mechanism given by examples in this invention is by UV radiation cured free radical reaction. The same concept can be readily extended to include other curing methods such as by temperature (thermal curing), by moisture (as commonly used in sol-gel reactions), and by chemical reactions (chemical curing).

In some embodiments, the invention is, consists essentially of, or comprises a highly transparent, moisture resistant antifogging nanocomposite coating further comprising a hydrophilic-hydrophobic composite with both domain sizes smaller than the wavelength of light to maintain high transparency, and minimize light scattering, of any domain or its water droplet, condensed on or adsorbed within said coating. Further, in some embodiments, said nanocomposite is comprised of a surfactant having hydrophobic and hydrophilic segments and a reactive component curable by one or combinations of radiation, thermal, moisture and chemical reactions, said surfactant may be further chemically bonded to the hydrophobic domains with hydrophilic segments thereof exposed to air or neighboring hydrophilic domains wherein, in the presence of moisture, condensation occurs at the hydrophilic domain and spreads to the hydrophobic domain surface via interaction with the chemically bonded surfactant.

In some embodiments, the invention is, consists essentially of, or comprises a antifogging nanocomposite coating, wherein the hydrophobic domain further is a highly-crosslinked organic network and the hydrophilic domain is organic, inorganic or a combination thereof.

In some embodiments; the invention is, consists essentially of, or comprises an antifogging nanocomposite coating wherein the hydrophilic domain may be further comprised of a hydrophilic organic component and an inorganic group component; said organic hydrophilic component may be introduced as (i) a monomeric or oligomeric precursor, (ii) a linear polymer or (iii) a physically or chemically crosslinked polymer network; further, the inorganic group of the antifogging coating may be prepared by a sol-gel process and comprises (a) metal alkoxide precursors, (b) nanoparticles or (c) infiltrated nanoporous structure.

In some embodiments, the invention is, consists essentially of, or may include an aspect of the hydrophilic or hydrophobic domain of the invention which may be comprised of at least one hydrophilic acrylate or at least one multifunctional (double bonds) acrylate. In yet a further aspect, said at least one hydrophilic acrylate is at least one of hydroxyethyl methacrylate (HEMA), hydroxyethyl acrylate (HEA), or poly(ethylene glycol) acrylates (PEGA); further, said at least one multifunctional acrylate is at least one of aliphatic urethane hexaacrylates, dipentaerythritol hexaacrylate, epoxy dimethacrylates or epoxy diacrylates.

In some embodiments, the invention is, consists essentially of, or comprises an antifogging nanocomposite coating wherein the hydrophilic domain comprises surface modified inorganic nanoparticles or organic components comprised of at least one hydrophilic oligomers, such as acrylic acid, urethane, PVP, immine, chitosan or gelatin, which can react with the hydrophobic component by at least one of UV, thermal, moisture or chemical curing processes.

In some embodiments, the invention is, consists essentially of, or comprises an antifogging nanocomposite coating comprised of a surfactant with both hydrophilic and hydrophobic segments, and one or more reactive groups that can be chemically bonded to the hydrophobic domain by a curing process, wherein the composition of the surfactant may be an ester, ether and/or ionic salts, and further, the reactive group(s) may be one or a combination of vinyl, hydroxyl, carboxyl, acrylic, epoxy, urethane and/or amine, and further, the curing process may be UV, thermal, moisture or chemical crosslinking.

In one aspect of the invention, the antifogging nanocomposite coating has a water contact angle below ten degrees. In yet a further aspect of the invention, said hydrophilic domains have a size of not more than about 50 nm within the antifogging nanocomposite coating. In a further aspect of the invention, the antifogging nanocomposite coating may be UV curable and/or thermocurable.

In some embodiments, the invention is, consists essentially of, or comprises an antifogging nanocomposite coating comprising a surfactant derived from oleic acid, linolenic oil, and/or linoleic acid. In some embodiments, the coating surfactant may be comprised of: polyoxyethylenesorbitan monooleate; sorbitan monooleate; mannide monooleate; polyethylene glycol monooleate; polyethylene glycol dioleate; polyethylene glycol oleyl ether; polyethylene glycol linolenate; polyethylene glycol dilinolenate; polyethylene glycol linolenyl ether; polyethylene glycol linoleate; polyethylene glycol dilinoleate; and/or polyethylene glycol linoleyl ether.

In yet a further aspect of the invention, poly(ethylene glycol) monooleate may be present within the coating surfactant in an effective amount to provide a coating with a water contact angle not greater than ten degrees.

In some embodiments, the invention is, consists essentially of, or further comprises a radiation curable composition capable of providing a nanocomposite anti-fogging coating, said composition comprising: silica nanoparticles, at least one hydrophilic acrylate monomer, at least one multifunctional acrylate, and reactive surfactant, said reactive surfactant having hydrophobic and hydrophilic segments and a radiation curable reactive component, whereby, upon exposure to actinic radiation, said composition forms nanosized hydrophilic and hydrophobic domains and said surfactant chemically bonds to the hydrophobic domains with hydrophilic segments thereof exposed to air or neighboring hydrophilic domains; whereby, in the presence of moisture, condensation occurs at the hydrophilic domain and spreads to the hydrophobic domain surface via interaction with said chemically bonded surfactant, to thereby maintain transparency of said anti-fogging nanocomposite coating with high durability. In yet a further aspect of the invention, the radiation curable composition may be UV curable and/or thermocurable.

In some embodiments, the invention is, consists essentially of, or further comprises a process of providing an antifogging and abrasion-resistant coating on a substrate, comprising application of the UV curable composition on a transparent glass or plastic substrate, and further exposing the UV curable composition to UV radiation. Another aspect of the invention comprises a process wherein said UV curable coating is applied to said substrate by a roll-to-roll coating process, and further comprising thermocuring said UV curable coating.

In some embodiments, the invention is, consists essentially of, or comprises a coated substrate resistant to fogging in the presence of moisture, comprising an inorganic or organic substrate and coated thereon as an antifogging coating. In one aspect of the invention, the coated substrate may be transparent, opaque or translucent, and be comprised of a glass or plastic substrate.

In some embodiments, the invention is, consists essentially of, or comprises an article comprising an antifogging nanocomposite coating. In some embodiments, said article further comprises a glass or plastic substrate. In one aspect of the invention, the article substrate may be film and, in some embodiments, may be comprised of an optical-grade film, and may further include film which is PET. Further embodiments of the invention may include an article wherein said article is a device having a display, said device with a display further comprising a mobile phone, PDA, palm device, camera, vehicle dashboard, computer monitor and/or medical equipment.

In some aspects of the invention, said article may include an optical grade substrate. The invention further provides that the substrate may include eye glasses, safety glasses, eye shields, windshields, mirrors, headlights, fog lights, motorcycle helmet shields, camera, door, window, and/or medical equipment. In said embodiments for an eye shield, the article is further adapted for high-performance, military and/or sport applications. Within embodiments for an article wherein a door or window separates an internal and external media, said internal and external media may further incorporate a temperature difference.

In some embodiments, the invention is, consists essentially of, or comprises a highly transparent, moisture resistant antifogging nanocomposite coating further comprising a hydrophilic-hydrophobic composite with both domain sizes smaller than the wavelength of light to maintain high transparency, and minimize light scattering of any domain or its water droplet, condensed on or adsorbed within said coating. Further, in some embodiments, said nanocomposite is comprised of a surfactant having hydrophobic and hydrophilic segments and a reactive component curable by one or combinations of radiation, thermal, moisture and chemical reactions, said surfactant may be further chemically bonded to the hydrophobic domains with hydrophilic segments thereof exposed to air or neighboring hydrophilic domains wherein, in the presence of moisture, condensation occurs at the hydrophilic domain and spreads to the hydrophobic domain surface via interaction with the chemically bonded surfactant, wherein the surfactant is a surfactant derived from oleic acid, linolenic oil, and/or linoleic acid or the surfactant comprises, consists of or is polyoxyethylenesorbitan monooleate, sorbitan monooleate, mannide monooleate, polyethylene glycol monooleate, polyethylene glycol dioleate, polyethylene glycol oleyl ether, polyethylene glycol linolenate, polyethylene glycol dilinolenate, polyethylene glycol linolenyl ether, polyethylene glycol linoleate, polyethylene glycol dilinoleate, and/or polyethylene glycol linoleyl ether.

The present inventors and/or their assignee, have long been working on organic-inorganic nanocomposites, which may be specifically designed to create super-hydrophilic or -hydrophobic coatings either by controlling surface composition or morphology. For example, as noted in the above-mentioned copending applications, as well as for example, the commonly assigned copending application Ser. No. 09/601,888, filed Aug. 9, 2000, the disclosures of which are incorporated herein, in their entirety, by reference thereto, the applicants have been able to accomplish the preservation of phase uniformity at small length scales (e.g., <50 nm) such that the inherent composition or morphology variations do not scatter light and/or reduce the transmission. The present invention, in embodiments thereof, has incorporated principles from this prior work to create a highly transparent and long lasting hydrophilic coating for optical substrates, for example, made of either glass or an optical polymer, or non-optical substrates, e.g., metals, non-transparent polymers, woods, ceramics and the like, in order to prevent fogging, while maintaining, in the case of optical substrates, very high light transmission, and enduring coating longevity.

Accordingly, in embodiments of the present invention, there is provided an anti-fog coating technology that can be readily scaled up and be processed at a low cost. Most current anti-fog coatings are thermally cured and, consequently, applied only by batch processes. The present invention provides a UV curable, anti-fog coating that can be processed continuously, e.g., by a roll-to-roll process, which is the preferred process for most optical functional coatings.

DETAILED DESCRIPTION AND PREFERRED EMBODIMENTS

The coating compositions of the present invention can be applied to a variety of solid substrates by conventional methods, such as flowing, spraying or dipping, to form a continuous surface film. In one embodiment of the present invention roll-to-roll coating operation is conveniently used in a continuous or semi-continuous coating and/or curing process.

Substrates which are especially contemplated in embodiments of the present invention include transparent and non-transparent plastics and metals, although other substrates, such as, for example, wood and ceramic, may also be used. More particularly, the plastics include synthetic organic polymeric substrates such as acrylic polymers, like poly(methylmethacrylate), polyesters, such as poly (ethylene terephthalate), poly (butylene terephthalate), etc., polyamides, polyimides, acrylonitrile-styrene copolymers, styrene-acrylonitrile-butadiene copolymers, polyvinyl chloride, butyrates, polyethylene and the like. Polycarbonates, such as poly (bisphenol-A carbonate) and those polycarbonates known as Lexan®, sold by General Electric Company, may be especially useful optical substrates according to embodiments of the present invention. In other embodiments of the invention, the present AF coatings may be used for injection molded or extruded acrylics, such as polymethylmethacrylates. Metal substrates on which the present AF coatings may also be effectively applied include bright and dull metals, such as, for example, aluminum and bright metallized surfaces, such as, for example, sputtered chromium alloy. Other solid substrates contemplated herein include wood, painted surfaces, leather, glass, ceramics and textiles.

According to embodiments of the present invention, especially preferred substrates for the antifog (AF) coatings, include optical films, such as, for example, polyethylene terephthalate (PET) or triacetyl cellulose (TAC) or cellulose acetate butyrate (CAB). PET films have been widely used as protection films for TV screens and mobile phones and are also a preferred substrate. When an anti-fog coating is applied to PET by a roll-to-roll process, the cost of anti-fog treatment may be significantly lowered. Most existing windows and optical devices can be readily retrofitted with anti-fog function by adding such an AF protective film according to embodiments of the present invention.

By choice of the proper formulation, application conditions and pretreatment of the substrate including the use of primers, the coatings can be adhered to substantially all solid substrates. Generally, a durable AF coating having all of the aforementioned characteristics and advantages may be obtained by the removal of any residual solvent and volatile materials, if any, which may be formed during or as a result of UV curing, such as, for example, water, methanol, ethanol, isopropanol.

Coating thicknesses may vary depending on the particular application and anticipated environment and conditions of use, but, generally, for improved abrasion-resistance and general durability, as well as AF properties, coating thickness of 3-10 microns, such as, for example, 5 microns, may be utilized.

The design principle of achieving anti-fog functionality is to make a substrate surface extremely hydrophilic so that the water condensation forms a flat film rather than many light-scattering water droplets. From surface thermodynamics point of view, the contact angle of water on the substrate surface should be reduced to be as low as possible. The contact angle, $\theta$, of water on a substrate is related to three interfacial energies, as shown in the following formula, $$\gamma_{SV} - \gamma_{SL} = \gamma_{LV} \cdot \cos\theta$$

where $\gamma_{SV}$, $\gamma_{SL}$, and $\gamma_{LV}$ are the interfacial tensions of the solid-vapor, solid-liquid, and liquid-vapor interfaces, respectively. FIG. 3 provides a graphical representation of the contact angle.

According to de Gennes' theory [de Gennes, P. G, "Wetting: statics and dynamics," *Rev. Mod. Phys.* Vol. 57, No. 3, Part 1 (July 1985) p. 827], the interfacial tension and the contact angle could be correlated with the molecular properties of the interfacial compositions. Specifically, one can write as: $2\gamma_{LV} = k\alpha_L^2$, and $\gamma_{SV} + \gamma_{LV} - \gamma_{SL} = k\alpha_S\alpha_L$, where $\alpha_L$ and $\alpha_S$ are the polarizabilities of liquid and solid molecules respectively. These will lead to the following equation of the contact angle:

$$\cos\theta = \frac{2\alpha_S}{\alpha_L} - 1,$$

which prescribes how to change the contact angle on a substrate by chemical modifications of its surface. Incorporating a coating with polarizability (or, equivalently, molecular interaction) very similar to that of water molecules ($\alpha_S \sim \alpha_L$, i.e. being hydrophilic) should reduce the contact angle to be close to zero.

The present invention provides a nano-engineered composite layer which contains both hydrophilic and hydrophobic domains at nanometer scales on a substrate surface such that there are adequate hydrophilic domains to reduce the overall contact angle of the coating to below about 10°, especially, below about 5°, preferably, below about 2 or 3°, including 0° to about 1°, while also having sufficient hydrophobic domains to preserve the composite coating's mechanical integrity. By using, for example, a hydrophilic acrylic polymer component in embodiments of the present composite coatings the resulting composite coating may absorb a sufficient amount of moisture to maintain integrity and AF properties, even under highly humid conditions and/or after immersion in water, such as aqueous cleaning. The hydrophobic domains in the preferred embodiments of the invention prevent excessive swelling of the hydrophilic polymer by entrapped water and also preserves mechanical integrity of the coating during use or washings. Because water has a refractive index (n~1.33) lower than most polymers (n~1.45 to 1.5), the hydrophilic domains would scatter light in proportion to the degree of swelling. The preferred embodiments of the present invention can control the size of the hydrophilic domains in the composite to be smaller than about 50 nm in order to maintain high optical transparency. In addition, as generally shown schematically, in FIG. 1, by anchoring the reactive surfactant(s) (molecules with both hydrophilic and hydrophobic segments as well as reactive sites) to the hydrophobic domain, the contact angle of those domains may be substantially reduced. Chemical bonding of the surfactant with the coating will make its defogging effects substantially permanent.

Embodiments of the present invention include the following features and advantages:
  (a) the domain size of hydrophilic-hydrophobic composite is much smaller than the optical wavelength to maintain high transparency;
  (b) moisture condensation occurs first at the hydrophilic domain and spreads to the hydrophobic domain surface via interaction with the anchored surfactants;
  (c) sufficient amount of surfactant(s) help the condensed water droplets form a water sheet across all domains;
  (d) the individual domain sizes (e.g., about 100 nm or less, especially about 50 nm or less) are much smaller than the wavelength of light to minimize light scattering of any domain or its droplet;

(e) the surfactant(s) is (are) chemically bonded to the hydrophobic domains with their hydrophilic segments exposed to air or neighboring hydrophilic domains;

(f) the composite coating formulations contain reactive monomers, oligomers and surfactants that are UV curable.

Although the most important functional properties of coatings according to preferred embodiments of the present invention include defogging and high transparency, a successful product also generally requires striking a balance among physical, mechanical and optical properties. For example, for many commercial applications, the nano-engineered composite defog (AF) coating should also pass tests designed for evaluating scratch resistance, hardness, stickiness (in swollen conditions) and substrate adhesion. Following the nano-engineering approach according to the embodiments of the present invention, these different requirements have been met by using hydrophobic and hydrophilic components with the respective functional properties. In particular, according to embodiments of the present invention, UV curable acrylics are used as the base ingredients and anchor a relatively large amount of reactive surfactant(s) to help fine-tune properties of the nano-hydrophilic and nano-hydrophobic domains.

The individual domain size may be made much smaller than the wavelength of light to reduce the light loss from domain scattering. The organic component may be introduced as (i) a precursor, which can be a monomer or an oligomer, (ii) a linear polymer, or (iii) a polymer network, physically or chemically crosslinked. The inorganic part may be created by sol-gel technology in the form of (a) metal alkoxide precursors, (b) nanoparticles, (c) infiltrated nanoporous structure. For example, the hydrophilic nanocomposite may be synthesized by using polymerizable organic precursors and reactive silica nanoparticles modified with surface ligand groups.

The hydrophilic domain may be formed by, but not limited to, the hydrophilic acrylates such as hydroxyethyl methacrylate (HEMA), hydroxyethyl acrylate (HEA), poly(ethylene glycol) acrylates (PEGA) with different PEG molecular weight, or other hydrophilic acrylates, e.g., 3-hydroxy propyl acrylate, 3-hydroxy propyl methacrylate, 2-hydroxy-3-methacryloxy propyl acrylate, 2-hydroxy-3-acryloxy propyl acrylate, 2-hydroxy-3-methacryloxy propyl methacrylate, diethylene glycol diacrylate, triethylene glycol diacrylate, tetraethylene glycol diacrylate, trimethylol propane triacrylate, tetrahydro furfuryl methacrylate, and 1-6-hexanediol diacrylate.

In order to make a viable coating product, the coating should have good abrasion and scratch resistance, chemical resistance, as well as weathering resistance for outdoor use. Therefore, according to preferred embodiments of the present invention, multifunctional (double bonds) acrylates, such as, aliphatic urethane hexaacrylate and dipentaerythritol hexaacrylate, are used to form a highly crosslinked polymeric network, thereby providing good mechanical properties for the coating layer. By altering the concentration of multifunctional acrylates in the coating matrix the performances of the coating may be fine tuned to balance the AF, optical and physicomechanical properties. Other acrylates with relatively high glass transition temperatures such as, for example, epoxy dimethacrylates and epoxy diacrylates, may also be used to adjust hardness of the coating material.

Hybrid coating compositions based on UV-curable or heat-curable resin and inorganic particles have been known to offer good mechanical properties, for example, reference may be made to the following issued U.S. Pat. Nos. 4,239,798, 4,348, 462 and 5,712,325, the disclosures of which are incorporated, herein, in their entireties, by reference thereto. See also, for example, *Thin Solid Films*, 351, 216-219 (1999). For example, surface modified silica nanoparticles may be used to further reinforce the coating material and to adjust the water swelling behavior of the coating layer. Thus, according to the preferred embodiments of the present invention, the nanocomposite coatings have sufficient water absorption capability within a restricted network and have good mechanical properties even when the coating is in a completely wet state.

Surface modified silica nanoparticles, which may be used in embodiments of the present invention, are commercially available, for example, Highlink OG 101-31, from Clariant (France). This surface modified silica nanoparticle, initially developed by Hoechst (France) with a molecular structure as shown in FIG. 2, consists of a 30 wt % suspension of spherical monodispersed silica nanoparticles in hydroxyethylacrylate (HEA). These nanoparticles have an average of 13 nm in diameter and are functionalized by HEA, which can copolymerize with a variety of acrylates to obtain different acrylate based nanocomposites. The high functionality of the nanoparticle provides better mechanical properties to the materials.

Other types of nanoparticles, such as those containing silica nanoparticles modified by ligands of a silane coupling agent, may also be used in embodiments of the present invention. The general formula of the functional group containing silane is $R^1SiX_3$, in which $R^1$ is a non-hydrolyzable chemical moiety with a functional group. The hydrolyzable moiety X includes, for example, halogen, alkoxy and alkylcarbonyl, where the alkoxy and alkyl groups may contain, for example, from 1 to about 12 carbon atoms, preferably, from about 1 to about 6 carbon atoms, especially, preferably, from about 1 to 4 carbon atoms. The functional groups on the moiety $R^1$ are polymerizable groups, such as vinyl, acryloxy, and methacryloxy. In preferred embodiments, acrylate containing silanes, such as, methacryloxy propyl trimethoxy silane ($CH_2=C(CH_3)-COO-C_3H_7-Si(OCH_3)_3$: methacryloxy propyl triethoxy silane $CH_2=C(CH_3)-COO-C_3H_7Si(OCH_2CH_3)_3$ may be used to obtain acylate modified silica particle by a sol-gel process. Typically, functional silanes are added into a silica nanoparticle suspension with an acid as catalyst, followed by hydrolysis and condensation with silanol groups on the surface of the silica nanoparticles, and chemically bonding to the nanoparticle surface.

Thus, according to preferred embodiments of the present invention, there are used highly hydrophilic reactive surfactants which are mobile during processing, but which become permanently anchored after curing.

For a high humidity environment, the AF effect generated by moisture absorption alone would not generally be sufficient because a thin coating layer has only limited capacity of absorbing water. For treating a high amount of moisture, the preferred embodiments of the present invention include at least one hydrophilic surfactant. In particular, surfactants with reactive groups, which can be chemically bonded with the hydrophobic domains in the hydrophilic-hydrophobic composite network during crosslinking reaction (FIG. 1) are preferably used. The reactive surfactants, with at least one double bond in the hydrophobic side will co-polymerize with acrylates in the composite and permanently anchor the surfactant to the coating surface. As shown in the following examples, the coatings made with the reactive surfactant according to the present invention, provide a coating with water contact angle as low as 10°, especially as low as 5°; even more preferably, as low as 2° to 3°, or even close to or at 0°, e.g., 1° or lower. Furthermore, in embodiments of the present invention, there is no significant lose of AF effect after immersing the coated sample in water at room temperature for at least as long as one week. In comparison, samples having non-reactive surfactant lose their AF effect just several minutes after immersion. Samples prepared according to our invention could pass the most stringent EN 168 fogging durability test.

Typically, the UV-curable nanocomposite AF coatings have four basic components, namely, (1) silica nanoparticles, (2) at least one hydrophilic acrylate monomer, (3) at least one multifunctional acrylate, and (4) at least one reactive surfactant. Suitable silica nanoparticles, which may be used in embodiments of the present invention are commercially available, for example, surface modified silica nanoparticles from Clariant with a brand name of Highlink OG 101-31 or regular silica nanoparticles from other silica nanoparticle suppliers, such as, Gelest and Nissan Chemical. See, also, the aforementioned prior applications of the present inventions and others. The particle size used should be smaller than about 100 nm, preferably, smaller than about 50 nm, and well dispersed in the coating matrix to ensure the transparency of the coating. Typical hydrophilic acrylates include hydroxyethyl methacrylate (HEMA), hydroxyethyl acrylate (HEA), poly(ethylene glycol) acrylates (PEGA), poly(ethylene glycol) diacrylates with different PEG molecular weights. The multifunctional acrylates include a wide range of acrylate monomers or oligomers with functional groups of 2 to 6. The reactive surfactants with at least one double bond in the hydrophobic side include, for example, the surfactant families that are made from oleic acid, linolenic oil and linoleic acid.

Suitable amounts of the components in the AF coating may be as follows: silica nanoparticles, 10~30%; hydrophilic acrylate(s), 50~70%; multifunctional acrylate(s), 15~35%; reactive surfactant(s), 1~10%. Amounts of ingredients might be varied depending on the customer's demand in balancing Antifog and other (such as optical, mechanical) properties. Photoinitiators, such as 1-hydroxycyclohexyl phenyl ketone, benzophenone, 2-isopropyl thioxanthone and the like, are preferably used to induce curing of the coating materials. The initiator amounts may, generally, be in the range of 3 wt % to 8 wt %, based on solid content of the coating materials. The coating may also be cured with electron-beam radiation without the use of initiators. The AF coating can be coated onto a variety of substrates with different applying methods such as wire-bar, spinning, and dipping. The optical substrates may be, for example, glass, PC lens or PC film, PET film, TAC film, CAB film. An adhesion promoting layer may facilitate bonding for some plastic substrates, such as PC, TAC and CAB. Specifically, UV-curable urethane based acrylates can be applied on PC, TAC and CAB substrate as a primer to ensure the adhesion of the AF coating to these substrates.

EXAMPLES AND RESULTS

Anti-fogging effect test with moisture generated from hot water: in a 250 ml beaker, add 200 ml water then heat and keep the water at 80° C. Place samples 1.5 cm above the water surface and measure how long is the time until fogging occurs. This will determine the AF effect of the sample related to the moisture absorption capacity of the coating. Fog should not form on the AF coatings containing reactive surfactants with an induced water sheeting mechanism. The durability of the AF coating can be evaluated by immersing the coating samples into water. After water immersion for a different length of time, the AF effects will be tested by both hot and cold methods as mentioned above.

Example 1

In 6.0 grams Highlink OG 101-31 containing 30% silica nanoparticles in hydroxyethyl acrylate (Clariant), 2.0 grams 67% poly(ethylene glycol) acrylate (PEGA, average MW ~375) IPA solution, 1.2 grams 67% aliphatic urethane hexaacrylate (EM6145-100 from Eteral, Taiwan) IPA solution and 1.2 grams 67% bisphenol A glycerolate dimethacrylate IPA solution are added. 5% photo-initiator is added after the solution becomes completely clear. The coating solution is applied onto PET film by wire-bar and then cured with 200 WPI UV at 20 ft/min. The coating is clear and has sufficient hydrophilicity to prevent instantaneous fogging. The fogging time is 10-20 seconds when the coating is exposed to moisture generated from 80° C. hot water.

Example 2

In 6.0 grams Highlink OG 101-31 containing 30% silica nanoparticle in hydroxyethyl acrylate (Clariant), 2.0 grams 67% poly(ethylene glycol) acrylate (PEGA, average MW ~375) IPA solution, 1.2 grams 67% allphatic urethane hexaacrylate (EM6145-100 from Eteral, Taiwan) IPA solution and 1.2 grams 67% bisphenol A glycerolate dimethacrylate IPA solution are added. Then 0.5 gram 20% Triton X-100 IPA solution is added. 5% photo-initiator is added after the solution becomes completely clear. The coating solution is applied onto a PET film by wire-bar and then cured with 200 WPI UV at 20 ft/min. Instead of fogging, clear water film forms on the coating surface when the coating is exposed to moisture generated from 80° C. hot water. Soaking the coating sample in 80° C. hot water for 5 minute degrades the AF effect of the coating without adding surfactant Triton-100, which fogs after exposing to moisture for 10~20 seconds.

Example 3

In 6.0 grams Highlink OG 101-31 containing 30% silica nanoparticle in hydroxyethyl acrylate (Clariant), 2.0 grams 67% poly(ethylene glycol) acrylate (PEGA, average MW ~375) IPA solution, 1.2 grams 67% aliphatic urethane hexaacrylate (EM6145-100 from Eteral, Taiwan) IPA solution and 1.2 grams 67% bisphenol A glycerolate dimethacrylate IPA solution are added. Then 0.4 gram 20% poly(ethylene glycol) monooleate (Mn ~860) IPA solution is added. 5% photo-initiator is added after the solution becomes completely clear. The coating solution is applied onto a PET film by wire-bar and cured with 200 WPI UV at 20 ft/min. Instead of fogging, a clear water film forms on the coating surface when the coating is exposed to moisture generated from 80° C. hot water. The AF effect of the coating does not significantly change after the coating sample is soaked in water at room temperature or 80° C. hot water for 1 hour, which proves that the reactive surfactant is chemically anchored on the coating surface.

Example 4

In 6.0 grams Highlink OG 101-31 containing 30% silica nanoparticle in hydroxyethyl acrylate (Clariant), 2.0 grams 67% poly(ethylene glycol) acrylate (PEGA, average MW ~375) IPA solution, 1.2 grams 67% aliphatic urethane hexaacrylate (EM6145-100 from Eteral, Taiwan) IPA solution and 1.2 grams 67% ethoxylated pentaerythritol tetraacrylate (SR494) IPA solution are added. Then 0.4 gram 20% poly(ethylene glycol) monooleate (Mn ~860) IPA solution is added. 5% photo-initiator is added after the solution becomes completely clear. The coating solution is applied onto PET film by wire-bar and cured with 200 WPI UV at 20 ft/min. Instead of fogging, a clear water film forms on the coating surface when the coating is exposed to moisture generated from 80° C. hot water. The AF effect of the coating does not significantly change after the coating sample is soaked in water at room temperature or 80° C. hot water for 1 hour.

Example 5

In 6.0 grams Highlink OG 101-31 containing 30% silica nanoparticle in hydroxyethyl acrylate (Clariant), 2.0 grams 67% poly(ethylene glycol) acrylate (PEGA, average MW ~375) IPA solution, 1.2 grams 67% aliphatic urethane hexaacrylate (EM6145-100 from Eteral, Taiwan) IPA solution and 1.2 grams 67% dipentaerythritol pentaacrylate (SR399) IPA solution are added. Then 0.4 gram 20% poly(ethylene glycol) monooleate (Mn ~860) IPA solution is added. 5% photo-initiator is added after the solution becomes completely clear. The coating solution is applied onto PET film by wire-bar and cured with 200 WPI UV at 20 ft/min. Instead of fogging, a clear water film forms on the coating surface when the coating is exposed to moisture generated from 80° C. hot water. The AF effect of the coating does not significantly change after the coating sample soaks in water at room temperature or 80° C. hot water for 1 hour.

Example 6

In 6.0 grams Highlink OG 101-31 containing 30% silica nanoparticle in hydroxyethyl acrylate (Clariant), 2.0 grams 67% poly(ethylene glycol) methacrylate (PEGMA, average MW ~500) IPA solution, 1.2 grams 67% aliphatic urethane hexaacrylate (EM6145-100 from Eteral, Taiwan) IPA solution and 1.2 grams 67% bisphenol A glycerolate dimethacrylate IPA solution are added. Then 0.4 gram 20% poly(ethylene glycol) monooleate (Mn ~860) IPA solution is added, 6% photo-initiator is added after the solution becomes completely clear. The coating solution is applied onto a PET film by wire-bar end cured with 200 WPI UV at 20 ft/min. Instead of fogging, a clear water film forms on the coating surface when the coating is exposed to moisture generated from 80° C. hot water. The AF effect of the coating does not significantly change after the coating sample soaks in water at room temperature or 80° C. hot water for 1 hour.

Example 7

In 4.0 grams hydroxyethyl methacrylate, 2.0 gram 67% poly(ethylene glycol) acrylate (PEGA, average MW ~375) IPA solution, 2.0 grams 67% aliphatic urethane hexaacrylate (EM6145-100 from Eteral, Taiwan) IPA solution, 2.0 grams 67% ethoxylated pentaerythritol tetraacrylate (SR494) IPA solution, and 2.0 grams silica particle/IPA suspension from Gelest are added. Then 3.0 grams 20% poly(ethylene glycol) monooleate (Mn ~860) IPA solution is added. 8% photo-initiator is added after the solution becomes completely clear. The coating solution is applied onto a PET film by wire-bar and cured with 200 WPI UV at 20 ft/min. Instead of fogging, a clear water film form on the coating surface when the coating is exposed to moisture generated from 80° C. hot water. The AF effect of the coating does not significantly change after the coating sample soaks in water at room temperature or 80° C. hot water for 1 hour.

Example 8

In 4.0 grams hydroxyethyl methacrylate, 2.0 grams 67% poly(ethylene glycol) acrylate (PEGA, average MW ~375) IPA solution, 2.0 grams 67% aliphatic urethane hexaacrylate (EM6145-100 from Eteral, Taiwan) IPA solution, 2.0 grams 67% dipentaerythritol pentaacrylate (SR399) IPA solution, and 2.0 grams silica particle/IPA suspension from Gelest. Then 3.0 grams 20% poly(ethylene glycol) monooleate (Mn ~860) IPA solution is added. 8% photo-initiator is added after the solution becomes completely clear. The coating solution is applied onto a PET film by wire-bar and cured with 200 WPI UV at 20 ft/min. Instead of fogging, a clear water film forms on the coating surface when the coating is exposed to moisture generated from 80° C. hot water. The AF effect of the coating does not significantly change after the coating sample soaks in water at room temperature or 80° C. hot water for 1 hour.

Example 9

In 4.0 grams hydroxyethyl methacrylate, added 2.0 grams 67% poly(ethylene glycol) methacrylate (PEGA, average MW ~500) IPA solution, 2.0 grams 67% allphatic urethane hexaacrylate (EM6145-100 from Eteral, Taiwan) IPA solution, 2.0 grams 67% dipentaerythritol pentaacrylate (SR399) IPA solution, and 2.0 grams silica particle/IPA suspension from Gelest are added. Then 3.0 grams 20% poly(ethylene glycol) monooleate (Mn ~860) IPA solution is added. 8% photo-initiator is added after the solution becomes completely clear. The coating solution is applied onto a PET film by wire-bar and cured with 200 WPI UV at 20 ft/min. Instead of fogging, a clear water film forms on the coating surface when the coating is exposed to moisture generated from 80° C. hot water. The AF effect of the coating does not significantly change after the coating sample soaks in water at room temperature or 80° C. hot water for 1 hour.

Example 10

In 4.0 grams hydroxyethyl methacrylate, 2.0 grams 67% poly(ethylene glycol) methacrylate (PEGA, average MW ~500) IPA solution, 2.0 grams 67% aliphatic urethane hexaacrylate (EM6145-100 from Eteral, Taiwan) IPA solution, 2.0 grams 67% dipentaerythritol pentaacrylate (SR399) IPA solution, and 2.0 grams silica particle/IPA suspension from Gelest are added. Then 3.0 grams 20% poly(ethylene glycol) monooleate (Mn ~860) IPA solution is added. 8% photo-initiator is added after the solution becomes completely clear. The coating solution is applied onto a PC film by wire-bar and cured with 200 WPI UV at 20 ft/min. The AF coating delaminates when it is exposed to moisture generated from 80° C. hot water. To obtain sufficient adhesion of the AF on the PC substrate, a primer with a composition of 70% aliphatic urethane hexaacrylate and 30% methacryloxypropyl trimethoxysilane is applied and cured on the PC before applying the AF coating. The primer layer provides sufficient adhesion and water resistance of the AF coating on PC. After adding the primer, the same AF effect as the coating on a PET substrate is observed. The AF effect of the coating does not significantly change after the coating sample soaks in water at room temperature or 80° C. hot water for 1 hour.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A hydrophilic-hydrophobic composite, comprising:
   a) a plurality of hydrophobic domains, wherein the domains have a size that is smaller than the wavelength of visible light;
   b) a plurality of hydrophilic domains, wherein the domains have a size that is smaller than the wavelength of visible light; and
   c) a residue of a surfactant comprising:
      i) a hydrophobic segment chemically bonded to at least one of the plurality of hydrophobic domains via a hydrophobic domain reactive component on the hydrophobic segment; and
      ii) a hydrophilic segment having a hydrophilic domain affinity.

2. The composite of claim 1, wherein the chemically bonded hydrophobic segment to the at least one of the plurality of hydrophobic domains is formed via curing by at least one of the following: radiation, thermal, moisture, or chemical reaction.

3. The composite of claim 1, wherein the composite is a highly transparent, moisture resistant antifogging coating.

4. The composite of claim 1, wherein the hydrophobic domains and/or hydrophilic domains, in the presence of a water droplet, condensed on or adsorbed in said domains, maintains high transparency and minimizes light scattering of said domains.

5. The composite of claim 1, wherein:
   i) the surfactant comprises an ester, ether, or an ionic salt;
   ii) the hydrophobic domain reactive component comprises one or more reactive groups comprising a vinyl group, a hydroxyl group, a carboxyl group, an acrylic group, an epoxy group, a urethane group, or an amine group; and/or
   iii) the reactive component is cured by UV, thermal, moisture, or chemical crosslinking.

6. The composite of claim 1, wherein the surfactant is derived from oleic acid, linolenic oil, and/or linoleic acid.

7. The composite of claim 1, wherein the surfactant comprises a residue of at least one of the following:
   a) polyoxyethylenesorbitan monooleate;
   b) sorbitan monooleate;
   c) mannide monooleate;
   d) polyethylene glycol monooleate;
   e) polyethylene glycol dioleate;
   f) polyethylene glycol oleyl ether;
   g) polyethylene glycol linolenate;
   h) polyethylene glycol dilinolenate;
   i) polyethylene glycol linolenyl ether;
   j) polyethylene glycol linoleate;
   k) polyethylene glycol dilinoleate; or
   l) polyethylene glycol linoleyl ether.

8. The composite of claim 1, wherein a plurality of the hydrophobic domains present, and/or the hydrophilic domains present, in the composite have a size smaller than the wavelength of visible light.

9. The composite of claim 1, wherein a substantial number of the hydrophobic domains present, and/or the hydrophilic domains present, in the composite have a size smaller than the wavelength of visible light.

10. The composite of claim 1, wherein the hydrophobic domains present, and/or the hydrophilic domains present, in the composite have a size smaller than the wavelength of visible light.

11. The composite of claim 1, wherein the hydrophobic domains have a size of 100 nm or less.

12. The composite of claim 1, wherein the hydrophilic domains have a size of 100 nm or less.

13. A radiation curable composition, comprising:
   a) a surface modified silica nanoparticle;
   b) at least one radiation curable hydrophilic monomeric or oligomeric precursor;
   c) at least one multifunctional acrylate; and
   d) a reactive surfactant having a hydrophobic segment, a hydrophilic segment, and a radiation curable reactive component;
   wherein upon exposure to actinic radiation:
      i) said composition forms a plurality of nanosized hydrophilic domains and a plurality of nanosized hydrophobic domains;
      ii) a chemical bond forms between the hydrophobic segment of the surfactant and at least one of the formed plurality of hydrophobic domains via the radiation curable reactive component; and
      iii) the hydrophilic segment of the chemically bonded surfactant has a hydrophilic domain affinity.

14. The composition of claim 13, wherein the composition provides a nanocomposite anti-fogging coating.

15. A coated substrate resistant to fogging in the presence of moisture, comprising an inorganic or organic substrate and coated thereon with the antifogging coating of claim 3.

16. The coated substrate of claim 15, wherein the substrate is transparent.

17. The coated substrate of claim 16, wherein the substrate is a glass or a plastic substrate.

18. The coated substrate of claim 15, wherein the substrate is opaque or translucent.

19. An article comprising the antifogging coating of claim 3.

20. The article of claim 19, further comprising a substrate.

21. The article of claim 20, wherein the substrate is glass or plastic.

22. The article of claim 21, wherein the substrate is a film.

23. The article of claim 22, wherein the substrate is an optical-grade film.

24. The article of claim 23, wherein the film is PET, PC, PMMA, or TAC.

25. The article of claim 19, wherein the article is a device having a display.

26. The composite of claim 1, wherein the composite is a nano-engineered anti-fogging (defog) coating further passes a test evaluating: scratch resistance; hardness; stickiness; or substrate adhesion.

27. A curable coating composition, comprising:
   a) a surface modified silica nanoparticle;
   b) at least one curable hydrophilic monomeric or oligomeric precursor;
   c) at least one multifunctional acrylate; and
   d) a reactive surfactant having a hydrophobic segment, a hydrophilic segment, and a curable reactive component;
   wherein upon curing:
      i) the composition forms a plurality of nanosized hydrophilic domains and a plurality of nanosized hydrophobic domains;

ii) a chemical bond forms between the hydrophobic segment of the surfactant and at least one of the formed plurality of hydrophobic domains via the curable reactive component; and iii) the hydrophilic segment of the chemically bonded surfactant has a hydrophilic domain affinity.

28. The curable coating composition of claim 27, wherein the chemical bond formed between the hydrophobic segment of the surfactant and the at least one of the formed plurality of hydrophobic domains is formed via curing by at least one of the following: radiation, thermal, moisture, or chemical reaction.

29. The curable coating composition of claim 27, wherein the composition is a highly transparent, moisture resistant antifogging coating composition.

* * * * *